(12) United States Patent
Chen

(10) Patent No.: US 6,742,398 B2
(45) Date of Patent: *Jun. 1, 2004

(54) IMPULSIVE PROPELLING SYSTEM

(76) Inventor: Chao-Hsun Chen, 1F, No. 22, Lane 60, Chou-Shan Rd., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,947

(22) Filed: Apr. 11, 2000

(65) Prior Publication Data

US 2003/0140708 A1 Jul. 31, 2003

(51) Int. Cl.$^7$ ................................................ G01N 3/08
(52) U.S. Cl. ........................................................ 73/826
(58) Field of Search ........................ 73/826, 799, 810, 73/150 A, 834, 865.3, 852, 1.39, 803; 473/443; 296/68.1

(56) References Cited

U.S. PATENT DOCUMENTS

| 3,658,332 A | * | 4/1972 | Adduci et al. | ............... 473/443 |
| 4,232,895 A | * | 11/1980 | Yoshio et al. | ............... 296/68.1 |
| 5,005,424 A | * | 4/1991 | Markowski | ................. 73/834 |
| 5,355,716 A | * | 10/1994 | Castelli | ...................... 73/1.39 |
| 5,483,845 A | * | 1/1996 | Stein et al. | ................. 73/865.3 |
| 5,685,193 A | * | 11/1997 | Hurtubise et al. | ......... 73/150 A |
| 5,929,348 A | * | 7/1999 | Stein et al. | ................. 73/865.3 |
| 6,023,984 A | * | 2/2000 | Mazur et al. | ............... 73/865.3 |

* cited by examiner

*Primary Examiner*—Edward Lefkowitz
*Assistant Examiner*—Octavia Davis
(74) *Attorney, Agent, or Firm*—Ladas & Parry

(57) ABSTRACT

An impulsive propelling system includes a stationary base member, a movable frame body, an energy storing member and a pushing device. The movable frame body is disposed adjacent to one side of the stationary base frame and is movable in an advancing direction away from the stationary base frame. The energy storing member has a first end secured to the stationary base member, and a second end secured to the movable frame body. The energy storing member resists movement of the movable frame body in the advancing direction. The pushing device has one end secured to the stationary base frame, and an opposite end abutting against the movable frame body. The pushing device is operable to push the movable frame body in the advancing direction, thereby subjecting the energy storing member to a tensile stress. The energy storing member fractures when the tensile stress that is applied thereto exceeds tensile strength of the energy storing member, thereby resulting in instantaneous movement of the movable frame body in the advancing direction away from the stationary base frame.

12 Claims, 5 Drawing Sheets

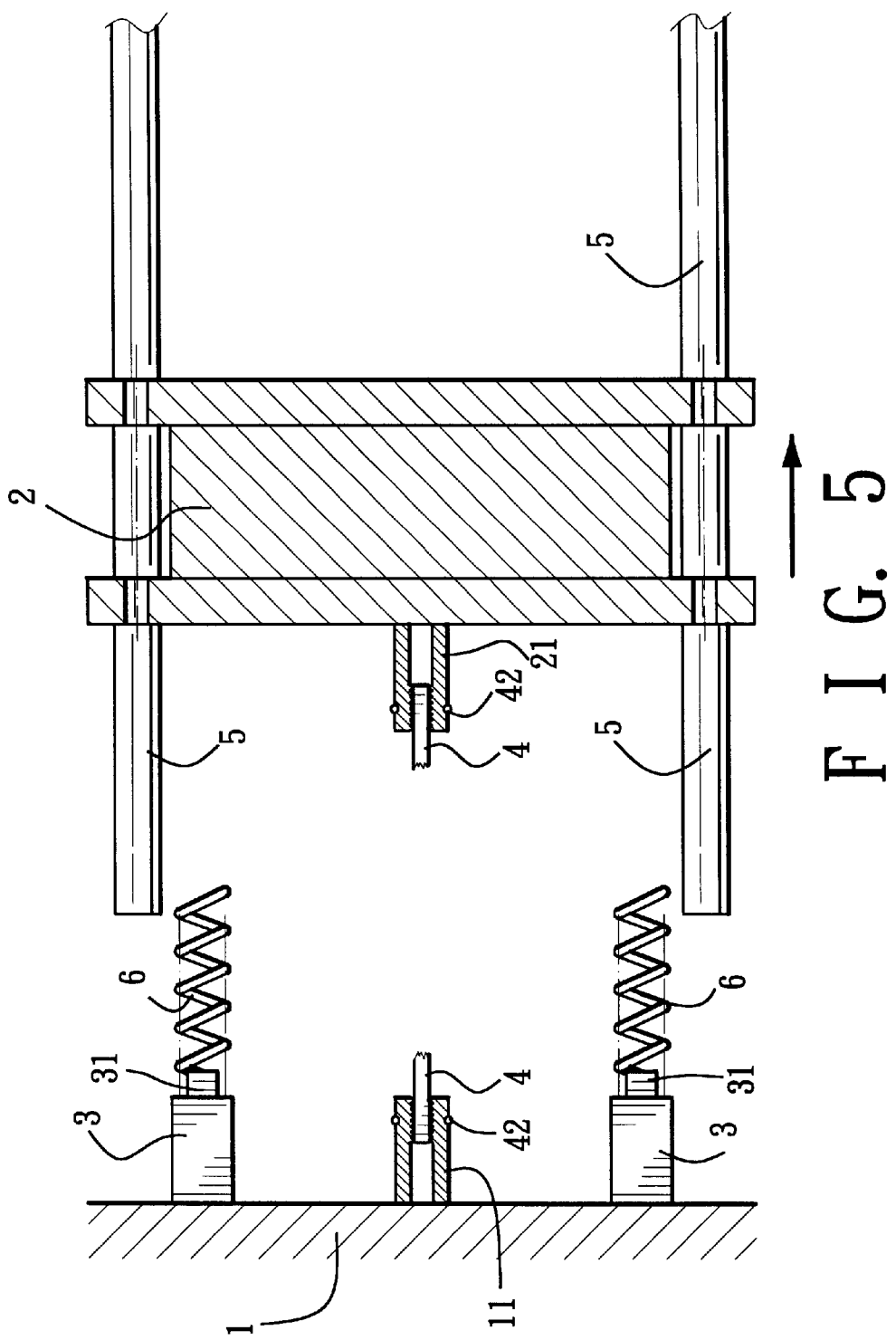

IMPULSIVE PROPELLING SYSTEM

BACKGROUND OF THE INVENTION

1. Field of the Invention

The invention relates to an impulsive propelling system, more particularly to an impulsive propelling system that is capable of high speed movement within a relatively short amount of time and a relatively short distance.

2. Description of the Related Art

A conventional impulsive propelling system, which can be used in an impact test for car safety, such as air bag design, usually includes springs or hydraulic cylinders for providing push power to a test body. In the conventional structure using springs or hydraulic cylinders, the test body is usually accelerated to a movement speed only about 25 km/hr, which is not fast enough to simulate an actual car crash.

In the other impulsive propelling technique, such as a rocket or missile impulsive propelling system, the power comes from combustion. Since combustion with the use of explosives can be influenced by other factors, this impulsive propelling technique results in unstable control and increases the risk of an accident.

SUMMARY OF THE INVENTION

Therefore, the main object of the present invention is to provide an impulsive propelling system that is capable of a high speed movement within a relatively short amount of time and a relatively short distance.

Another object of the present invention is to provide an impulsive propelling system that is safe to use.

According to the present invention, an impulsive propelling system includes a stationary base member, a movable frame body, an energy storing member and a pushing device.

The movable frame body is disposed adjacent to one side of the stationary base frame and is movable in an advancing direction away from the stationary base frame.

The energy storing member has a first end secured to the stationary base member, and a second end secured to the movable frame body. The energy storing member resists movement of the movable frame body in the advancing direction.

The pushing device has one end secured to the stationary base frame, and an opposite end abutting against the movable frame body. The pushing device is operable to push the movable frame body in the advancing direction, thereby subjecting the energy storing member to a tensile stress. The energy storing member fractures when the tensile stress that is applied thereto exceeds tensile strength of the energy storing member, thereby resulting in instantaneous movement of the movable frame body in the advancing direction away from the stationary base frame.

BRIEF DESCRIPTION OF THE DRAWINGS

Other features and advantages of the present invention will become apparent in the following detailed description of the preferred embodiments with reference to the accompanying drawings, of which:

FIG. 5 is a partly sectional, schematic top side view showing the second preferred embodiment when the energy storing member fractures.

DETAILED DESCRIPTION OF THE PREFERRED EMBODIMENTS

Figure 1:
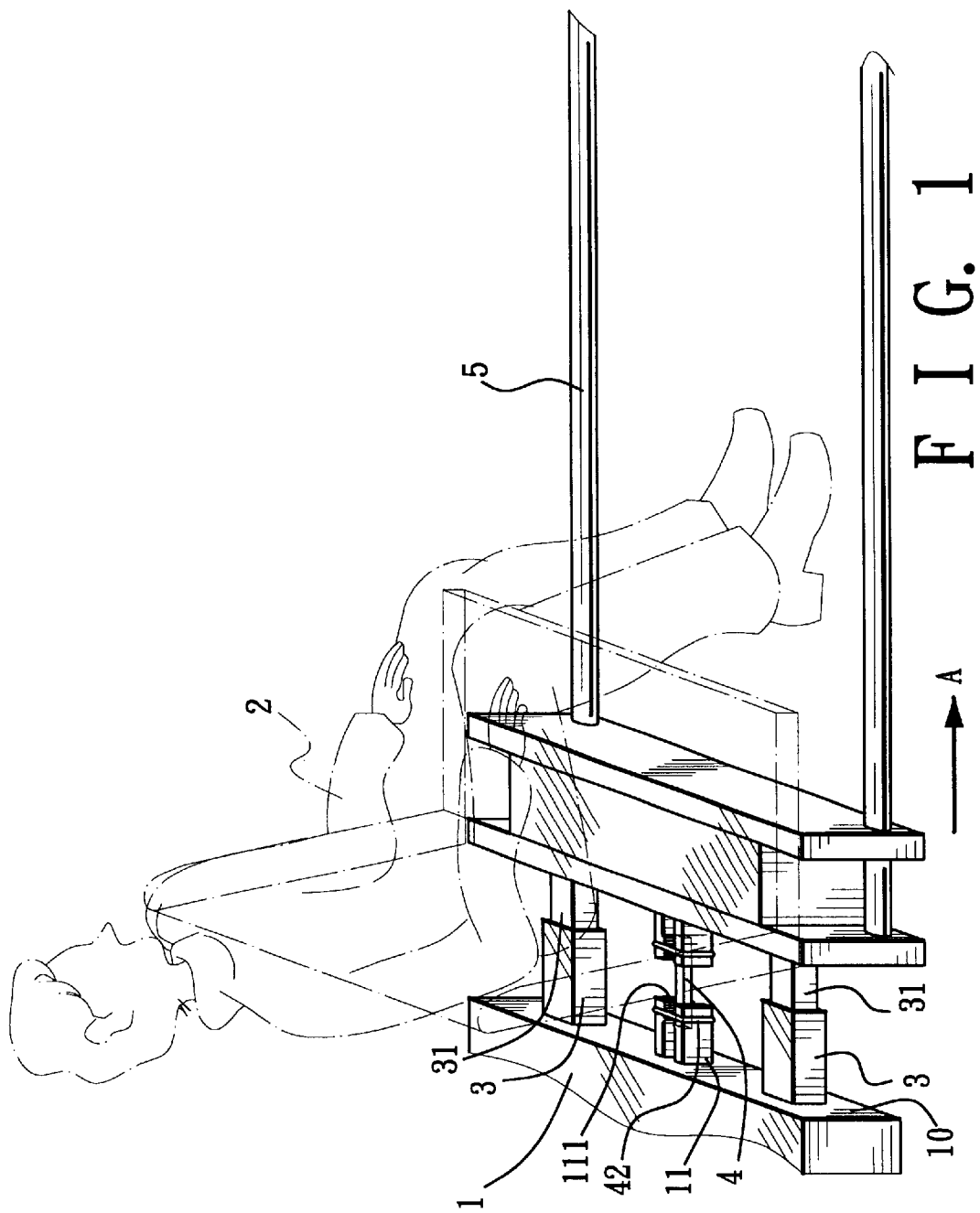
FIG. 1 is a perspective view showing the first preferred embodiment of a impulsive propelling system according to this invention.

Before the present invention is described in greater detail, it should be noted that like elements are denoted by the same reference numerals throughout the disclosure.

Figure 2:
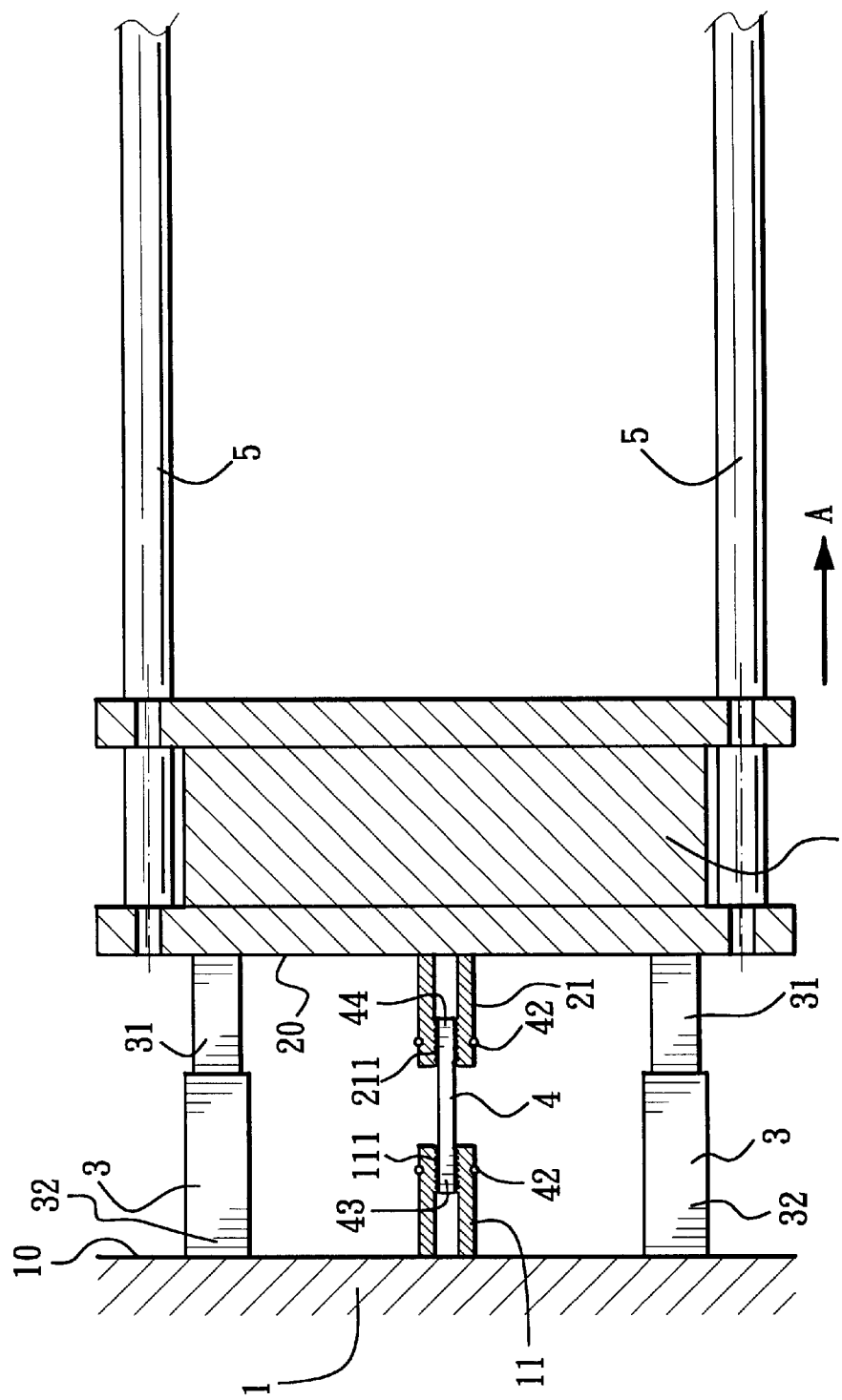
FIG. 2 is a partly sectional, schematic top side view of the first preferred embodiment.

Referring to FIGS. 1 and 2, according to the first preferred embodiment of the invention, a impulsive propelling system is shown to include a stationary base frame 1, a movable frame body 2, an energy storing member 4 and a pushing device.

The stationary base frame 1 has one side 10 with a bar clamp 11 having a toothed inner surface 111 provided thereon.

The movable frame body 2 is disposed adjacent to the side 10 of the stationary base frame 1. The movable frame body 2 is disposed on a guiding rail 5 and is movable in an advancing direction (A) away from the stationary base frame 1. In this embodiment, a dummy, which is seated on a seat, serves as the movable frame body 2 to simulate conditions of an actual car crash. The movable frame body 2 has one side 20 confronting the side 10 of the stationary frame body 1 and provided with a bar clamp 21 having a toothed inner surface 211.

The movable frame body 2 is disposed adjacent to the side 10 of the stationary base frame 1. The movable frame body 2 is disposed on a guiding rail 5 and is movable in an advancing direction (A) away from the stationary base frame 1. In this embodiment, a test dummy 2A, is seated on a seat of the movable frame body 2 to simulate conditions of an actual car crash. The movable frame body 2 has one side 20 confronting the side 10 of the stationary frame body 1 and provided with a bar clamp 21 having a toothed inner surface 211.

Figure 3:
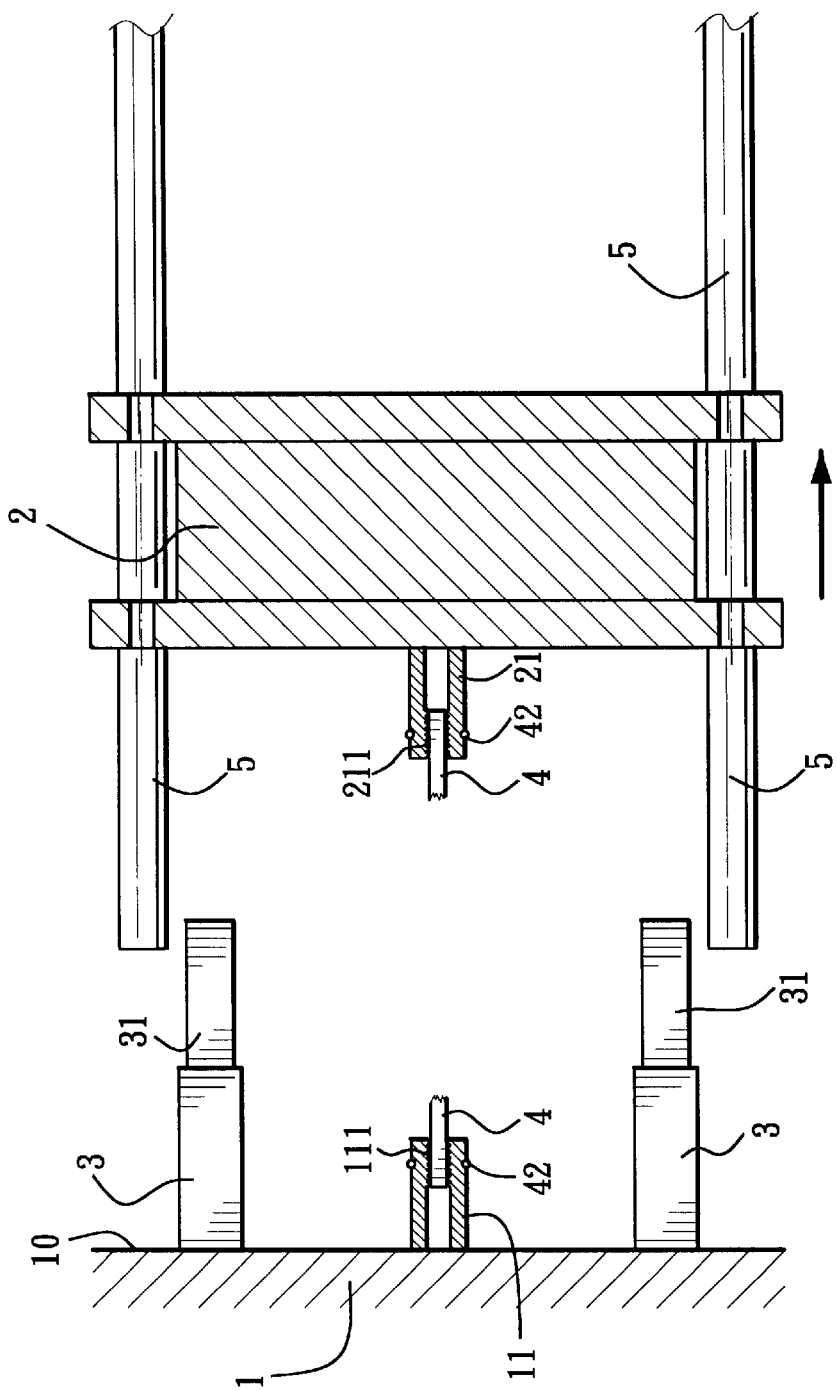
FIG. 3 is a partly sectional, schematic top side view showing the first preferred embodiment when the energy storing member fractures.

The pushing device includes two hydraulic jacks 3. Hydraulic cylinders (not shown) may also be used instead of the hydraulic jacks 3. Each of the hydraulic jacks 3 has one end 32 secured to the stationary base frame 1, and an opposite end provided with a piston 31 that abuts against the movable frame body 2. The hydraulic jacks 3 are operable to extend the pistons 31 so as to push the movable frame body 2 in the advancing direction, thereby subjecting the energy storing member 4 to a tensile stress. As shown in FIG. 3, the energy storing member 4 fractures when the tensile stress that is applied thereto exceeds tensile strength of the energy storing member 4, thereby resulting in instantaneous movement of the movable frame body 2 in the advancing direction away from the stationary base frame 1.

When the hydraulic jacks 3 are operated to extend the pistons 31 so as to provide push power to the movable frame body 2, the push power provided by the hydraulic jacks 3 results in tensile stress to the energy storing member 4 and is stored in the energy storing member 4 as a form of potential energy since the energy storing member 4 resists movement of the movable frame body 2. When the tensile stress exceeds the tensile strength of the energy storing member 4, the energy storing member 4 fractures so as to release the potential energy in a form of kinetic energy to the movable frame body 2 such that the movable frame body 2 can move instantaneously in the advancing direction away from the stationary base frame 1 at a relatively high speed within a relatively short amount of time and a relatively short distance.

Figure 4:
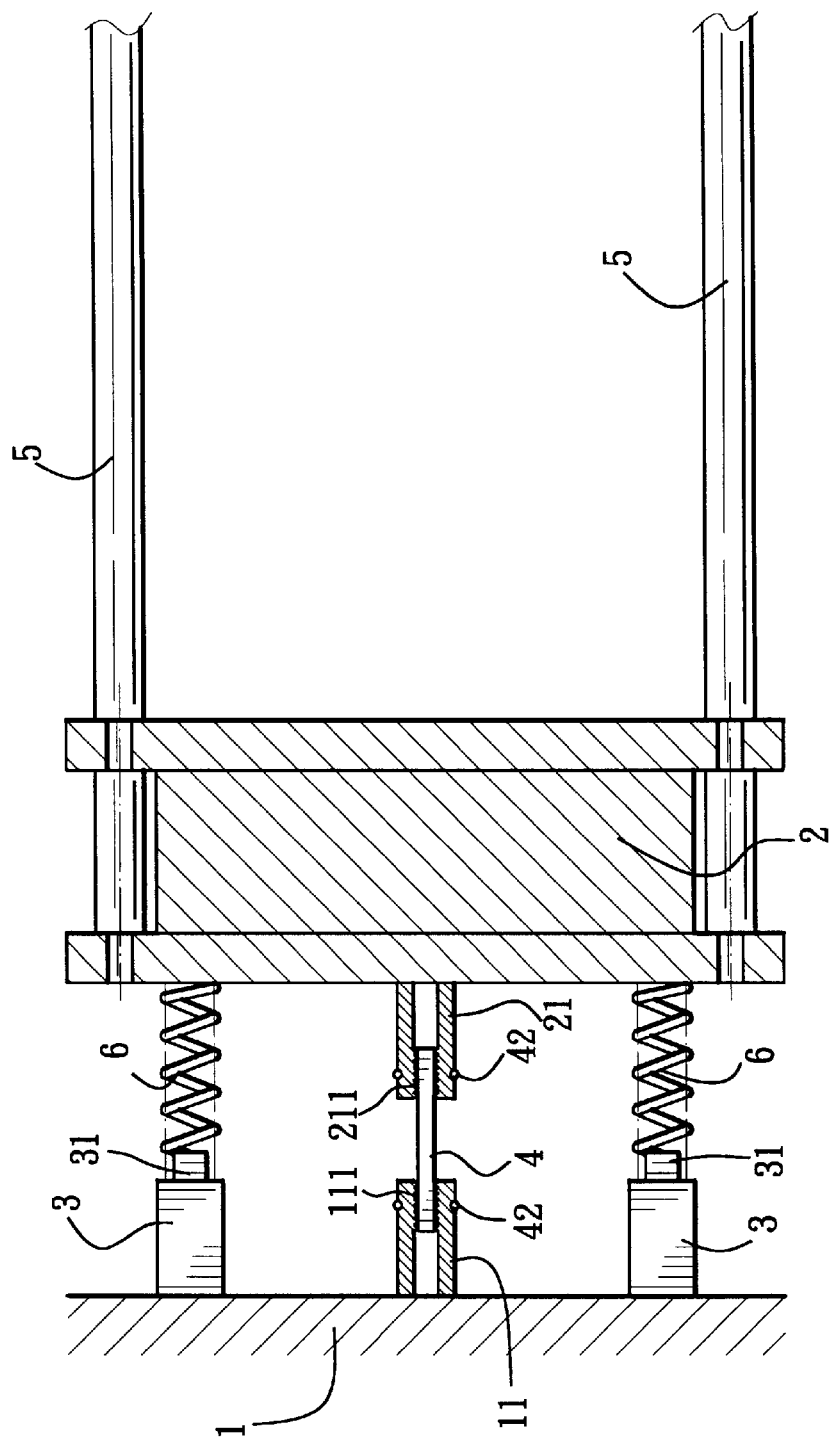
FIG. 4 is a partly sectional, schematic top side view showing the second preferred embodiment of a impulsive propelling system according to this invention.

FIGS. 4 and 5 show the second preferred embodiment of an impulsive propelling system according to this invention, which is a modification of the first preferred embodiment. Unlike the previous embodiment, the pushing device further includes two springs 6. Each of the springs 6 is disposed between a respective hydraulic jack 3 and the movable frame body 2. The springs 6 bear a part of the push power provided by the hydraulic jacks 3 and deform for storing the part of the push power in a form of spring potential energy. Therefore, when the energy storing member 4 fractures, aside from the kinetic energy provided by the energy storing member 4 to the movable frame body 2, the springs 6 further release the spring potential energy to the movable frame body 2 such that instantaneous movement of the movable frame body 2 in this embodiment is grater than that in the previous embodiment. In a test result, the speed of the movable frame body can reach up to 30 m/sec or 108 km/hr.

It is noted that the instantaneous high speed movement of the movable frame body depends on the material and sectional area of the energy storing member. Since the impulsive propelling system of this invention does not involve combustion, enhanced safety is possible when this invention is in use. The object of the invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An impulsive propelling system comprising:
   a stationary base frame;
   a movable frame body disposed adjacent to one side of said stationary base frame and movable in an advancing direction away from said stationary base frame;
   an energy storing member having a first end secured to said stationary base frame and a second end secured to said movable frame body, said energy storing member resisting movement of said movable frame body in the advancing direction, and
   a pushing device having one end secured to said stationary base frame, and an opposite end abutting against said movable frame body to apply force to said movable frame body in the advancing direction, said force being resisted by tensile stress in said energy storing member which holds said movable frame body in place, until the tensile stress in said energy storing member reaches a value to produce fracture thereof, said energy storing member being disposed between said stationary base frame and said movable frame body, and said movable frame body is freely movable independent of said pushing device and said stationary base frame without being restrained by said pushing device and said stationary base frame so that the movable frame body moves impulsively and upon the fracture of said energy storing member, wherein said movable frame body is adapted to support a test dummy which is propelled, upon fracture of said energy storing member, at a high instantaneous speed in said advancing direction of up to 108 km/hr. to simulate conditions of a car crash.

2. A method of utilizing the impulsive propelling system of claim 1 to test the dummy under simulated conditions of a car crash, wherein the dummy is seated on the movable frame body and is propelled therewith when the energy storing member is fractured thereby enabling the propelled dummy to be tested under a simulated condition of a car crash.

3. The method of claim 2, comprising propelling the movable frame body and the dummy seated thereon horizontally on guide rails.

4. The method of claim 3, comprising facing the dummy in said advancing direction.

5. The method of claim 3, wherein the pushing device continues to act on the movable frame body after the energy storing member is fractured.

6. The system of claim 1, wherein said energy storing member comprises a solid bar having a determined tensile stress at fracture.

7. Apparatus for propelling a testing dummy at a high instantaneous speed comprising:
   fixed horizontal guiding rails,
   a movable frame body slidably supported on said rails for movement in an advancing direction,
   said movable frame body supporting a testing dummy thereon,
   a stationary base frame adjacent to said movable frame body,
   an energy storing member having a first end secured to said stationary base frame and a second end secured to said movable frame body, said energy storing member resisting movement of said movable frame body in the advancing direction, and
   a pushing device having one end secured to said stationary base frame, and an opposite end abutting against said movable frame body, said pushing device being operable to apply force to said movable frame body in the advancing direction, thereby subjecting said energy storing member to a tensile stress while said energy storing member holds said movable frame body at rest, said pushing device and said energy storing member being cooperatively arranged so that said energy storing member is fractured when the tensile stress that is applied thereto exceeds tensile strength of said energy storing member, whereupon said movable frame body with said testing dummy thereon is propelled on said rails at high instantaneous speed in the advancing direction away from said stationary base frame for impact testing of the dummy.

8. The impulsive propelling system of claim 7, wherein said pushing device includes a hydraulic jack.

9. The impulsive propelling system of claim 8, wherein said pushing device further includes a spring disposed between said hydraulic jack and said movable frame body.

10. The impulsive propelling system of claim 7, wherein said pushing device and said energy storing member act together, when the energy storing member is fractured, to propel said movable frame body, without restraint, along said guiding rails at a determined test speed.

11. The apparatus of claim 7, wherein the tensile strength of said energy storing member is determined so that when the energy storing member is fractured, said movable body with the dummy thereon, is propelled at the instantaneous speed for impact testing of the dummy.

12. The apparatus of claim 11, wherein said energy storing member comprises a solid bar having the determined tensile strength.

* * * * *